(12) United States Patent
Nagata et al.

(10) Patent No.: US 6,863,968 B2
(45) Date of Patent: Mar. 8, 2005

(54) NON-ASBESTOS-BASED FRICTION MATERIALS

(75) Inventors: Takeo Nagata, Gunma (JP); Jun Nagashima, Gunma (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/207,126

(22) Filed: Jul. 30, 2002

(65) Prior Publication Data

US 2003/0026969 A1 Feb. 6, 2003

(30) Foreign Application Priority Data

Jul. 30, 2001 (JP) ........................................ 2001-228923
May 24, 2002 (JP) ........................................ 2002-150604

(51) Int. Cl.$^7$ ................................................. D04H 1/00
(52) U.S. Cl. ............................... 428/292.1; 428/297.4; 428/299.1; 428/375; 188/199; 420/8
(58) Field of Search .................... 428/292.1, 297.4, 428/299.1, 375; 188/199; 420/8

(56) References Cited

U.S. PATENT DOCUMENTS

| | | | |
|---|---|---|---|
| 3,267,048 A | | 8/1966 | Horste et al. |
| 4,119,591 A | * | 10/1978 | Aldrich ...................... 523/156 |
| 4,352,416 A | * | 10/1982 | Larson et al. |
| 4,387,140 A | * | 6/1983 | Kondo et al. |
| 4,415,363 A | * | 11/1983 | Sanftleben et al. ............ 75/229 |
| 4,552,259 A | * | 11/1985 | Albertson .............. 192/107 M |
| 4,920,159 A | * | 4/1990 | Das et al. ................... 523/153 |
| 6,193,025 B1 | * | 2/2001 | Nakagawa ............... 188/73.37 |
| 6,197,106 B1 | * | 3/2001 | Tieckelmann et al. |
| 6,284,815 B1 | * | 9/2001 | Sasahara et al. ............ 523/149 |
| 6,612,415 B2 | * | 9/2003 | Yamane |

FOREIGN PATENT DOCUMENTS

| | | | |
|---|---|---|---|
| CN | 1287182 | * | 3/2001 |
| JP | 59-24772 | | 2/1984 |
| JP | 60-1278 | | 1/1985 |
| JP | 6-129454 | | 5/1994 |
| JP | 8-254237 | | 10/1996 |
| JP | 2001-501650 | | 3/1998 |
| RU | 2 132 982 | | 7/1999 |
| WO | WO 98-12448 | * | 3/1998 |

OTHER PUBLICATIONS

"Properties, Applications and Product Information of Steel Wool", retrieved from the Internet.
"Product Info, Steel Wool", retrieved from the Internet.

* cited by examiner

*Primary Examiner*—B. Hamilton Hess
*Assistant Examiner*—Camie S Thompson
(74) *Attorney, Agent, or Firm*—Westerman, Hattori, Daniels & Adrian, LLP

(57) ABSTRACT

A non-asbestos-based friction material for brakes, clutches or the like for automobiles, large-size trucks, railway cars and various industrial machines. The friction material has excellent friction and rust preventive characteristics, and attacks the plane it faces to a limited extent. The non-asbestos-based friction material is produced by forming and then curing the non-asbestos-based friction material composition comprising a fibrous base, binder and filler as the major ingredients. The composition contains at least one type of steel fibers selected from the group consisting of iron, special dead soft steel and dead soft steel, containing carbon (C) at 0.13% or less at specific contents, in the fibrous base at 1 to 50% by volume of the whole friction material.

11 Claims, No Drawings

NON-ASBESTOS-BASED FRICTION MATERIALS

TECHNICAL FIELD

This invention relates to a non-asbestos-based friction materials to be used for brakes, clutches or the like for automobiles, large-size trucks, trains and various industrial machines, and, more particularly, the friction material to be used for brakes, clutches or the like for automobiles, large-sized trucks, trains and various industrial machines, and having excellent friction performance and lower tendency of counter surface attack.

BACKGROUND OF THE INVENTION

The friction members for disk brake pads, brake shoes, clutch plates or the like for automobiles or the like are composed of a friction material to which an iron-based back material is attached to form the monolithic structure. These friction members generate a frictional force when subject to a relative motion therebetween, e.g., with the disk rotor or clutch plate it faces while being pressed to engage the brake of the automobile or to transmit the engine's driving force to the wheels. Therefore, a friction material should satisfy various requirements, e.g., high resistance to wear, high and stable coefficient of friction, high resistance to fade to have the coefficient of friction not rapidly deteriorate at high temperatures, generating little abnormal sound, and lower counter surface (hereinafter sometimes referred to as rotor) attack.

In order to satisfy these requirements, a friction material is composed of materials of various characteristics in the major basic portions of the fibrous base, binder and filler to exhibit the required frictional functions. However, a tough material highly resistant to wear and hence difficult to be worn out tends to more often attack counter surfaces. On the other hand, a soft material that attacks the plane it faces less tends to be less resistant to fade. A material highly resistant to fade, e.g., metal, has a coefficient of friction of insufficient stability. In short, a single material cannot satisfy all of the performance requirements.

The low steel type material or the semi-metallic material comprising a base of steel fibers, binder of phenolic thermosetting resin (e.g., phenol resin) and inorganic or metallic friction/wear modifier has been attracting attention due to its much higher thermal stability and resistance to wear than those of the asbestos-based friction material. The frictional characteristics of the low steel type or the semi-metallic friction material are determined by the ratio of steel fibers serving as the base, and the friction/wear modifier incorporated in the base. It is normal practice to create the desired frictional characteristics by incorporating abrasives of a high degree of hardness (e.g., alumina, chromium oxide or quartz), inorganic filler (e.g., barium sulfate or calcium carbonate), a hard metal or the like and lubricant composed of cashew dust, graphite or soft metal (e.g., copper or brass).

However, increasing the ratio of hard material, e.g., steel fibers or abrasives, to improve braking characteristics and resistance to wear may cause various problems, (e.g., wear of the rotor surface which faces the brake pad or the like and wear of the friction material formed into a given shape,) and resultant deterioration of the brake characteristics and rotor serviceability. This forms a vicious cycle in which the scratches and irregularities formed on the rotor surface cause the so-called abrasive wear to roughen the friction material shape surface and further deteriorate the frictional characteristics.

Therefore, the friction material containing steel fibers as the fibrous base has a major disadvantage of large counter surface attack against the surface which the friction material faces, although it has an advantage of good friction characteristics at high temperature.

Moreover, the semi-metallic friction material containing a high proportion of steel fibers has problems of rusting the friction material itself and the rotor. The friction material incorporating stainless steel fibers to solve the rusting problems still has problems of large counter surface attack, although the rusting problems are reduced.

Even the low-steel friction material, reduced in steel fiber content to reduce the disadvantages involved in the semi-metallic friction material, still has the problems of attacking the plane it faces and rusting.

Therefore, various friction materials containing steel fibers have been proposed to solve the above problems. These include the semi-metallic friction materials comprising steel fibers, binder and filler, as disclosed by Japanese Patent Laid-open Publication Nos. 59-24772 and 60-1278; friction materials of sintered iron type comprising iron fibers (e.g., steel fibers), iron particles or metallic binder, and dispersed with graphite particles, as disclosed by International Patent Publication No.2001-501650; friction materials for brakes, comprising fibers incorporated with a lubricant or the like, the fibers being metallic (e.g., steel or copper), having a diameter of 20 $\mu$m or more and contained at 10 to 20% by volume on the friction material for brakes, as disclosed by Japanese Patent Laid-open Publication No.8-254237; and non-asbestos-based friction materials comprising a fibrous component other than asbestos, thermosetting resin component (e.g., phenolic resin) and filler component (e.g., graphite or barium sulfate), the fibrous component containing, at least partly, steel fibers produced by vibration cutting, as disclosed by Japanese Patent Laid-open Publication No.6-129454.

In spite of these proposals, however, only a few of the so-called semi-metallic friction materials, which contain high proportions of steel-based fibers, have good coefficients of friction at high temperatures and, at the same time, lower counter surface attack. On the other hand, the friction material containing no steel fibers has the problem of insufficient coefficient of friction, which makes it impractical. The friction material containing a high proportion of lubricant to improve resistance to wear has problems that it cannot secure a sufficient coefficient of friction or resistance to wear at low and high temperature.

Therefore, there are great demands for the non-asbestos-based friction materials which have excellent friction and rust preventive characteristics, and much lower counter surface attack.

It is an object of the present invention to provide a non-asbestos-based friction material for brakes, clutches or the like for automobiles, large-size trucks, railway cars and various industrial machines, which has excellent friction and rust preventive characteristics, and attacks the plane it faces only to a limited extent.

DISCLOSURE OF THE INVENTION

The inventors of the present invention have noted, after having extensively studied to overcome the problems involved with conventional techniques, steel fibers for the fibrous base, and then they found the surprising results that the non-asbestos-based friction material attacks the plane it faces to a much lesser extent when the friction material composition is incorporated with an adequate quantity of fine fibers of dead soft steel having a carbon content close to that of pure iron, especially when the steel fibers are annealed. The present invention has been developed based on the above knowledge.

The first aspect of the invention is a non-asbestos-based friction material produced by forming and then curing the non-asbestos-based friction material composition comprising a fibrous base, binder and filler as the major ingredients, wherein the composition contains at least one type of steel fibers selected from the group consisting of iron, special dead soft steel and dead soft steel in the fibrous base at 1 to 50% by volume on the whole friction material.

The second aspect of the invention is the non-asbestos-based friction material of the first aspect of the invention, wherein the steel fibers have a composition of carbon (C): 0.13% or less, silicon (Si): 0.35% or less, manganese (Mn): 0.60% or less, sulfur (S): 0.035% or less, and phosphorus (P): 0.030% or less.

The third aspect of the invention is the non-asbestos-based friction material of the first or second aspect of the invention, wherein the steel fibers have an average diameter of 10 to 120 μm.

The fourth aspect of the invention is the non-asbestos-based friction material of one of the first to third aspects of the invention, wherein the steel fibers are annealed.

As described above, the present invention relates to a non-asbestos-based friction material produced by forming and then curing the non-asbestos-based friction material composition comprising a fibrous base, binder and filler as the major ingredients, wherein the composition contains at least one type of steel fibers selected from the group consisting of pure iron, special dead soft steel and dead soft steel in the fibrous base at 1 to 50% by volume on the whole friction material. The preferred embodiments of the invention include the following:

(1) The non-asbestos-based friction material of the first aspect of the invention, wherein the composition contains the steel fibers at 1 to 10% by volume of the whole friction material.

(2) The non-asbestos-based friction material of the third aspect of the invention, wherein the steel fibers have an average diameter of 10 to 60 μm.

PREFERRED EMBODIMENTS OF THE INVENTION

The present invention is described in detail for each item.
1. Fibrous Base

The non-asbestos-based friction material of the present invention comprises a fibrous base, binder and filler as the major ingredients, wherein the composition contains at least one type of steel fibers selected from the group consisting of pure iron, special dead soft steel and dead soft steel in a fibrous base of 1 to 50% by volume of the whole friction material.

(1) Steel Fibers

The steel fibers for the non-asbestos-based friction material of the present invention are composed of at least one type of steel fibers selected from the group consisting of pure iron, special dead soft steel and dead soft steel. The pure iron, special dead soft steel or dead soft steel preferably has a composition of carbon (C): 0.13% or less, silicon (Si): 0.35% or less, manganese (Mn): 0.60% or less, sulfur (S): 0.035% or less, and phosphorus (P): 0.030% or less. When the carbon (C) content exceeds 0.13%, for example, the steel fibers may be hard and excessively attack counter surface.

Pure iron means a composition of carbon (C): 0.02% or less (C≦0.02%), the special dead soft steel means a composition of carbon (C): more than 0.02% and 0.08% or less (0.02%<C≦0.08%) and dead soft steel means a composition of carbon (C): more than 0.08% and 0.13% or less (0.08%<C≦0.13%).

The dead soft steel or the like for the steel fibers is preferably annealed to remove processing-induced hardening, i.e., to be prevented from becoming hard. This weakens the attack by the fibers on counter surface.

The steel fibers preferably have an average diameter of 10 to 120 μm, more preferably 10 to 60 μm. At an average fiber diameter of below 10 μm, the friction material may not have improved friction characteristics. At above 120 μm, on the other hand, the fibers may excessively attack the counter surface.

The length of the steel fibers is not limited. The average fiber length is normally around 10 to 5,000 μm, more preferably 100 to 3,000 μm. The fibers may cause deteriorated strength of the friction material when excessively short, and too much abrasiveness to excessively wear the counter surface when excessively long.

The content of the steel fibers of dead soft steel or the like is 1 to 50%, more preferably 1 to 10 μm by volume of the whole non-asbestos-based friction material composition for the present invention. At a content of below 1%, the friction material may not have improved friction characteristics. At above 50%, on the other hand, the friction material may excessively attack the counter surface.

(2) Other Fibrous Component

Fibrous components other than steel fibers can be used for the fibrous base for the non-asbestos-based friction material of the present invention.

The fibers useful for the present invention include inorganic and organic fibers for non-asbestos-based friction materials, which have been commonly used for friction materials.

The relatively hard fibers for the fibrous base include ceramic, natural mineral, glass and metallic fibers, and relatively soft ones include Aramid, carbon, cellulosic, acrylic and potassium titanate fibers. They may be used either individually or in combination. Of these, Aramid and potassium titanate fibers are more preferable.

More concretely, the ceramic fibers useful for the present invention include those composed of alumina and silica; alumina, silica and zirconia; and silica, calcium oxide and magnesium oxide as the major ingredients.

The natural mineral fibers include those of wollastonite and sepiolite.

The metallic fibers include those of stainless steel, bronze, copper, brass and aluminum.

In the present invention, the materials used for the fibrous substrate other than steel fibers are in the short fiber, pulp-shaped or powdery form. Its content is not limited, and it is appropriately selected for the specific component. It is normally around 5 to 90% by volume, based on the whole non-asbestos-based friction material composition, and preferably 20 to 70%.

2. Binders

The binder for the non-asbestos-based friction material of the present invention is selected from the known binders normally used for friction materials. They include thermosetting resins, e.g., phenolic, epoxy, urea and melamine resin and modifications thereof; heat-resistant resins, e.g., polyacetal, aromatic polyimide and fluorine resin; and NBR. They may be used either individually or in combination.

Its content is not limited for the present invention, and adequately selected for the specific component. It is normally around 5 to 50% by volume based on the whole non-asbestos-based friction material composition, preferably 10 to 25%.

3. Fillers

The filler component for the non-asbestos-based friction material of the present invention is selected from known inorganic or organic fillers commonly used for friction materials. They include molybdenum disulfide, antimony trisulfide, calcium carbonate, barium sulfate, magnesium oxide, cashew dust, graphite, calcium hydroxide, calcium fluoride, talc, molybdenum trioxide, antimony trioxide, zirconium silicate, iron oxide, mica, iron sulfide, zirconium oxide, powdered metal, quartz, silicon oxide, powdered rubber, alumina, chromium oxide and vermiculite. Of these, those having lubricity, e.g., molybdenum disulfide, antimony trisulfide, cashew dust, graphite and antimony trioxide, contribute to improved resistance to wear and reduced attack on counter surfaces, and conversely those having an abrasive effect, e.g., zirconium silicate, iron oxide, zirconium oxide, quartz, silicon oxide, alumina and chromium oxide, contribute to improved friction characteristics. They may be used either individually or in combination.

Content of the filler is not limited for the present invention, and it is appropriately selected for the specific component. It is normally around 5 to 60% by volume based on the whole non-asbestos-based friction material composition, preferably 10 to 40%.

4. Other, Optional Materials

The non-asbestos-based friction material of the present invention can be incorporated with one or more optional materials commonly used for friction materials, as required, in addition to the fibrous base, binder and filler, within limits not harmful to the object of the present invention. These include, but are not limited to, coke and phosphorus-based lubricant.

5. Method of Producing the Non-Asbestos-Based Friction Material

In the method of the present invention for producing the non-asbestos-based friction material, the components, e.g., the fibrous base, binder and filler, are uniformly mixed by a mixer, e.g., Henschel, Loedige or Eirich mixer, to produce the powder mixture to be formed, which is preliminarily formed in a forming mold, and then formed into a shape at 130 to 200° C. and 100 to 1000 Kg/cm² for 2 to 10 minutes.

The formed shape is heat treated at 140 to 250° C. for 2 to 48 hours (after curing), and, as required, spray-painted, baked and ground to produce the final product.

When the disk pad for automobiles or the like is to be produced, an iron or aluminum plate washed, surface-treated and coated with an adhesive agent beforehand is placed as the back plate on the preliminarily formed shape, and the resultant assembly is formed in a forming mold, heat treated, spray-painted, baked and ground.

The non-asbestos-based friction material of the present invention can be suitably used for various purposes, e.g., brake lining, clutch facing, disk pads and brake blocks for automobiles, large-size trucks, trains and various industrial machines.

EXAMPLES AND COMPARATIVE EXAMPLES

The present invention is described in more detail by EXAMPLES and COMPARATIVE EXAMPLES, which by no means limit the present invention.

In EXAMPLES and COMPARATIVE EXAMPLES, the extent of the attack by the friction material on a counter surface was evaluated by the plane attacking test in accordance with JASO C406-87 under the conditions of braking initial speed: 50 km/hour, braking deceleration speed: 0.15 g, number of braking cycles: 1000, brake temperature before braking: 150° C., and extent of wear of counter surface (rotor) was judged according to the following standards:

⊚: Very little (100 $\mu$m or less)
○: Little (100 to 200 $\mu$m)
Δ: Fairly much (200 to 300 $\mu$m)
X: Much (more than 300 $\mu$m)

The rusted condition was evaluated by the black scale test in accordance with JASO C402-88, where the vehicle was run on ordinary roads for 1000 km, and the rotor was removed and left for a week to observe the black scale on the rotor surface. Extent of rusting was evaluated according to the following standards:

⊚: No black scale evolved
○: Essentially no black scale evolved
Δ: Black scale evolved to some extent
X: Black scale evolved more largely EXAMPLES 1 to 17 and COMPARATIVE EXAMPLES 1 to 10

The components for each of the friction material compositions given in Table 1, comprising the fibrous base, binder and filler, were uniformly mixed by a Loedige mixer, and preliminarily formed under pressure of 100 kg/cm² for 1 minute in a pressure mold. The preliminarily formed shape was formed at 160° C. and 250 kg/cm² for an optional time, and then heat treated at 200° C. for 5 hours (after curing), to produce the brake pad for automobiles in each of EXAMPLES 1 to 17 and COMPARATIVE EXAMPLES 1 to 10. Each brake pad was subjected to counter surface attack and black scale tests, based on the specifications of an automobile of 1,800 cc displacement. The results are given in Table 1.

TABLE 1

| Friction Material Compositions (Components) | Examples | | | | | | | | | | | | | | | | | Comparative Examples | | | | | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 1 | 2 | 3 | 4 | 5 | 6 | 7 | 8 | 9 | 10 |
| Fibrous Base: Aramid pulp | 10 | 10 | 10 | 10 | 10 | 10 | 10 | 10 | 10 | 10 | 10 | 5 | 3 | 7 | 7 | 6 | 6 | 10 | 10 | 10 | 10 | 6 | 6 | 6 | 6 | 5 | 3 |
| Fibrous Base: Potassium Titanate | 17 | 17 | 17 | 17 | 17 | 17 | 17 | 17 | 17 | 17 | 17 | 8 | 4 | — | — | — | — | 17 | 17 | 17 | 17 | — | — | — | — | — | — |
| Binder: Phenolic Resin | 18 | 18 | 18 | 18 | 18 | 18 | 18 | 18 | 18 | 18 | 18 | 18 | 15 | 15 | 15 | 15 | 15 | 18 | 18 | 18 | 18 | 15 | 15 | 15 | 15 | 18 | 15 |
| Filler: Cashew Dust | 15 | 15 | 15 | 15 | 15 | 15 | 15 | 15 | 15 | 15 | 15 | 9 | 5 | 5 | 5 | 5 | 5 | 15 | 15 | 15 | 15 | — | — | — | — | 9 | 5 |
| Filler: Graphite | 7 | 7 | 7 | 7 | 7 | 7 | 7 | 7 | 7 | 7 | 7 | 7 | 4 | 4 | 4 | 4 | 4 | 7 | 7 | 7 | 7 | 7 | 7 | 7 | 7 | 7 | 7 |
| Filler: Abrasive Agent | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| Filler: Slaked Lime | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| Inorganic Filler | 21 | 16 | 21 | 16 | 21 | 16 | 21 | 16 | 21 | 16 | 16 | 16 | 9 | 9 | 9 | 10 | 10 | 21 | 16 | 21 | 16 | 5 | 5 | 5 | 5 | 16 | 9 |
| Steel fibers | — | — | — | — | — | — | — | — | — | — | — | — | — | — | — | — | — | 5 | 10 | — | — | — | — | — | — | — | — |
| Conventional Soft Steel, 90 μm diameter (*1) | — | — | — | — | — | — | — | — | — | — | — | — | — | — | — | — | — | — | — | 5 | — | 60 | — | — | — | 30 | 50 |
| Conventional Soft Steel, 60 μm diameter (*1) | — | — | — | — | — | — | — | — | — | — | — | — | — | — | — | — | — | — | — | — | 10 | — | 60 | — | — | — | — |
| Dead Soft Steel, 150 μm diameter (*2) | 5 | — | — | — | — | — | — | — | — | — | — | — | — | — | — | — | — | — | — | — | — | — | — | — | — | — | — |
| Dead Soft Steel, 120 μm diameter (*2) | — | 10 | — | — | — | — | — | — | — | — | 10 | 30 | 50 | — | — | — | — | — | — | — | — | — | — | — | — | — | — |
| Dead Soft Steel, 90 μm diameter (*2) | — | — | 5 | — | — | — | — | — | — | — | — | — | — | 50 | — | — | — | — | — | — | — | — | — | 60 | — | — | — |
| Dead Soft Steel, 60 μm diameter (*2) | — | — | — | 10 | — | — | — | — | — | — | — | — | — | — | 50 | — | — | — | — | — | — | — | — | — | 60 | — | — |
| Pure Iron, 120 μm diameter (*3) | — | — | — | — | 5 | — | — | — | — | — | — | — | — | — | — | 50 | — | — | — | — | — | — | — | — | — | — | — |
| Pure Iron, 50 μm diameter (*3) | — | — | — | — | — | 10 | — | — | — | — | — | — | — | — | — | — | 50 | — | — | — | — | — | — | — | — | — | — |
| Pure Iron, 30 μm diameter (*3) | — | — | — | — | — | — | 5 | — | — | — | — | — | — | — | — | — | — | — | — | — | — | — | — | — | — | — | — |
| Pure Iron, Annealed, 120 μm diameter (*3) | — | — | — | — | — | — | — | 10 | — | — | — | — | — | — | — | — | — | — | — | — | — | — | — | — | — | — | — |
| Pure Iron, Annealed, 50 μm diameter (*3) | — | — | — | — | — | — | — | — | 5 | — | — | — | — | — | — | — | — | — | — | — | — | — | — | — | — | — | — |
| Pure Iron, Annealed, 30 μm diameter (*3) | — | — | — | — | — | — | — | — | — | 10 | — | — | — | — | — | — | — | — | — | — | — | — | — | — | — | — | — |
| Total (Vol. %) | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| Evaluation for Friction Material: Counter surface attack | ○ | ○ | ○ | ○ | ⊙ | ○ | ⊙ | ○ | ⊙ | ⊙ | ○ | ○ | ○ | ○ | ○ | ○ | ○ | X | X | △ | X | △ | X | △ | X | X | X |
| Rusting | ○ | △ | ○ | △ | ○ | △ | ○ | ○ | ⊙ | ⊙ | △ | △ | △ | △ | △ | △ | △ | △ | △ | △ | △ | X | X | X | X | X | X |

TABLE 1-continued

| Friction Material Compositions | EXAMPLES | | | | | | | | | | | | | | | | | COMPARATIVE EXAMPLES | | | | | | | | | |
|---|---|---|---|---|---|---|---|---|---|---|---|---|---|---|---|---|---|---|---|---|---|---|---|---|---|---|
| (Components) | 1 | 2 | 3 | 4 | 5 | 6 | 7 | 8 | 9 | 10 | 11 | 12 | 13 | 14 | 15 | 16 | 17 | 1 | 2 | 3 | 4 | 5 | 6 | 7 | 8 | 9 | 10 |
| *1 Chemical Components | C: 0.15% | Si: 0.25% | Mn: 0.55% | P: 0.035% | S: 0.035% | | | | | | | | | | | | | | | | | | | | | | |
| *2 Chemical Components | C: 0.10% | Si: 0.25% | Mn: 0.45% | P: 0.025% | S: 0.025% | | | | | | | | | | | | | | | | | | | | | | |
| *3 Chemical Components | C: 0.002% | Si: 0.009% | Mn: 0.07% | P: 0.013% | S: 0.005% | | | | | | | | | | | | | | | | | | | | | | |

As shown in Table 1, the friction materials prepared in COMPARATIVE EXAMPLES 1 to 4 and 9 to 10, which directly used the conventional components e.g., steel fibers, for the fibrous base, are inferior to those prepared in the EXAMPLES, both in counter surface attack and black scale test results. More specifically, the friction material prepared in COMPARATIVE EXAMPLE 1 or the like is rated "Much" and "Black scale evolved to some extent" in counter surface attack and black scale test results, and hence is inferior to the friction materials prepared in EXAMPLES. The friction material prepared in COMPARATIVE EXAMPLE 5 to 8, containing dead soft steel fibers at 60% by volume of the whole composition and trace quantities of carbon and other component (e.g., silicon) is rated "Fairly Much" or "Much" in counter surface attack and bad both in counter surface attack and black scale test results. By contrast, it is observed that the friction material prepared in each of EXAMPLES 1 to 17, relating to the present invention, which used fibers of dead soft steel or pure iron containing trace quantities of carbon and other components (e.g., silicon) at a specific content for the fibrous base, are relatively good, both in counter surface attack and in black scale test results, and proved to cause no practical problems. It is particularly noted that the friction material prepared in each of EXAMPLES 7 to 10, which used the annealed fibers having an average fiber diameter in a specific range is good both in counter surface attack and black scale test results.

INDUSTRIAL APPLICABILIY

The non-asbestos-based friction material of the present invention exhibits notable advantages of excellent friction performance, lower counter surface attack and excellent rust preventive characteristics by containing fibers of dead soft steel or the like containing carbon (C) at 0.13% or less at specific contents for the fibrous base, and hence is of high quality. As such, it can be suitably used for brakes, clutches or the like for automobiles, large-size trucks, trains and various industrial machines.

What is claimed is:

1. A non-asbestos-based friction material comprising:
a fibrous base,
a resin binder,
a filler, and
steel fibers selected from the group consisting of pure iron, special dead soft steel and dead soft steel in the fibrous base, wherein the steel fibers have a composition of carbon (C): 0.13% or less, silicon (Si): 0.35% or less, manganese (Mn): 0.60% or less, sulfur (S): 0.035% or less, and phosphorus (P): 0.030% or less.

2. The non-asbestos-based friction material according to claim 1, wherein the steel fibers have an average diameter of 10 to 120 $\mu$m.

3. The non-asbestos-based friction material according to claim 1, wherein the steel fibers are annealed.

4. The non-asbestos-based friction material according to claim 1 wherein the steel fibers are included at 1 to 50% by volume of the friction material.

5. The non-asbestos-based friction material according to claim 1 wherein the steel fibers are made of pure iron having a carbon content of 0.02% or less.

6. The non-asbestos-based friction material according to claim 1 wherein the steel fibers are made of special dead soft steel having a carbon content between more than 0.02% and 0.08% or less.

7. The non-asbestos-based friction material according to claim 1 wherein the steel fibers are made of dead soft steel having a carbon content between more than 0.08% and 0.13% or less.

8. The non-asbestos-based friction material according to claim 1 wherein the steel fibers have a fiber length of 10 to 5000 $\mu$m.

9. The non-asbestos-based friction material according to claim 1, wherein the fibrous base comprises inorganic or organic fibers.

10. The non-asbestos-based friction material according to claim 1, wherein the resin binder is selected from the group consisting of thermosetting resins and heat-resistant resins.

11. The non-asbestos-based friction material according to claim 1, wherein the resin binder is included at an amount of 5 to 50% by volume in the non-asbestos-based friction material.

* * * * *